(12) United States Patent
Gisby et al.

(10) Patent No.: US 8,520,822 B2
(45) Date of Patent: Aug. 27, 2013

(54) METHOD FOR DESIGNATING OF HOSTING CONTROL FOR A CONFERENCE CALL

(75) Inventors: Douglas Michael Gisby, Atlanta, GA (US); Robert Joseph James, Jr., Leawood, KS (US)

(73) Assignee: BlackBerry Limited, Waterloo, Ontario (CA)

(*) Notice: Subject to any disclaimer, the term of this patent is extended or adjusted under 35 U.S.C. 154(b) by 842 days.

(21) Appl. No.: 12/646,493

(22) Filed: Dec. 23, 2009

(65) Prior Publication Data

US 2011/0150199 A1  Jun. 23, 2011

(51) Int. Cl.
*H04M 3/42* (2006.01)
*H04L 12/16* (2006.01)
*H04Q 11/00* (2006.01)

(52) U.S. Cl.
USPC ............ 379/202.01; 379/203.01; 379/204.01; 370/260; 370/261; 370/262; 455/416

(58) Field of Classification Search
USPC ............. 379/202.01, 203.01, 204.01, 201.01; 370/262, 259, 260, 261; 455/416
See application file for complete search history.

(56) References Cited

U.S. PATENT DOCUMENTS

| | | | | |
|---|---|---|---|---|
| 4,653,045 | A * | 3/1987 | Stanley et al. | 370/262 |
| 4,691,347 | A * | 9/1987 | Stanley et al. | 379/203.01 |
| 7,317,791 | B2 * | 1/2008 | Carlson | 379/202.01 |
| 2007/0116225 | A1 * | 5/2007 | Zhao et al. | 379/202.01 |
| 2008/0279118 | A1 | 11/2008 | Hyun | |
| 2010/0150373 | A1 * | 6/2010 | Sheth et al. | 381/82 |
| 2011/0051917 | A1 * | 3/2011 | Chen et al. | 379/202.01 |

FOREIGN PATENT DOCUMENTS

WO  2008033706 A1  3/2008

OTHER PUBLICATIONS

Nokia Intellisync Call Connect 2.0 for Alcatel-Lucent; Nokia; www.nokiaforbusiness.com; 2007.
Switching phones during an Incoming call: Calls-google voice help; http://www.google.com/support/voice/bin/answer.py?hl=en&answer=115080; retrieved Feb. 23, 2010.
Cisco Call Manager Best Practices (2004).
Extended European Search Report; 09180631.5; dated May 7, 2010.

* cited by examiner

*Primary Examiner* — Thjuan K Addy
(74) *Attorney, Agent, or Firm* — Finnegan, Henderson, Farabow, Garrett & Dunner, LLP

(57) ABSTRACT

A conference calling system and method for designating of hosting control from a server device. In a conference call session, one of the client devices may be designated as a host device, wherein that host device is permitted to implement hosting functions. In some instances, the required host device may not be available for the scheduled conference call, but may be available prior to the conference call. The host device may provide hosting control commands to the server device prior to the conference call. Such hosting control commands may include such commands as delegating of hosting control functions in relation to the designated host device. This may allow the presently designated host device to end communications with the server device prior to starting a conference call, while having the server device implement the specific hosting control commands.

16 Claims, 11 Drawing Sheets ns and methods, and in particular to designating of hosting control in relation to a conference call.

METHOD FOR DESIGNATING OF HOSTING CONTROL FOR A CONFERENCE CALL

FIELD

Example embodiments relate to conference call systems and methods, and in particular to designating of hosting control in relation to a conference call.

BACKGROUND

During a conference call, voice-communication connections are typically made between communication devices such as telephones or mobile phones. In some systems, one member of the conference call is often designated as the host. The host may be a user who schedules and hosts a conference call session, and may implement additional in-call hosting functions within the conference call.

In some existing conferencing systems, the conference call may not start or proceed without the presence of the host. When a conference call is desired to be made between communication devices, in some instances, the required host may not be available for the scheduled conference call. This may prevent the scheduled conference call from being established between the communication devices.

Other difficulties with existing teleconferencing systems will be apparent to those skilled in the art in view of the detailed description below.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

In a conference call, a host may be permitted to perform various hosting functions such as roll call, mute all, conference lock, etc. In some existing conference call systems, a conference call may not start or proceed without the presence of the host. If the host is unavailable, each of the client devices may contact a conference server and be waiting for the host to connect so that the conference call may begin. In such instances, the client devices may be unaware of the status of the conference call, whether it has been cancelled, delayed, etc. This may waste network resources, especially in a mobile network where unnecessary connections result in additional costs and network usage.

Example embodiments described herein relate to conference call systems and methods. In example embodiments, a conference call server device designates one of the client devices as a host device, for permitting implementation of hosting functions from the host device. In some instances, the designated host device may not be available for the scheduled conference call, but may be available prior to the conference call. In example embodiments, the designated host device may be permitted to provide hosting control commands to the server device prior to the conference call. The hosting control commands may include such commands as delegating of hosting control functions. Such hosting control commands of present embodiments should not be confused with the aforementioned hosting functions for roll call, mute all, conference lock, etc. Present examples of hosting control functions relate to the designating, associating, de-associating, and/or transferring of hosting control. Should the designated host device be unavailable for the scheduled conference call, the host device may have the server device implement the specific hosting control command, while terminating its own communications with the server device prior to the start of the conference call.

In some example embodiments, such a system may assist in allowing a scheduled conference call session to start or continue without the presence of a designated host device, while having the server device implement the specific hosting control command. Other aspects will be apparent to those of ordinary skill in the art from a review of the following detailed description in conjunction with the drawings.

Example embodiments relate to the control and management of conference call communications. Although reference may be made to "calls" and "talk" in the description of example embodiments below, it will be appreciated that the described systems and methods are applicable to session-based communications in general and not limited to voice calls. Reference to calls may for example include voice calls as well as media sessions which may for example include video and/or audio.

Figure 1:
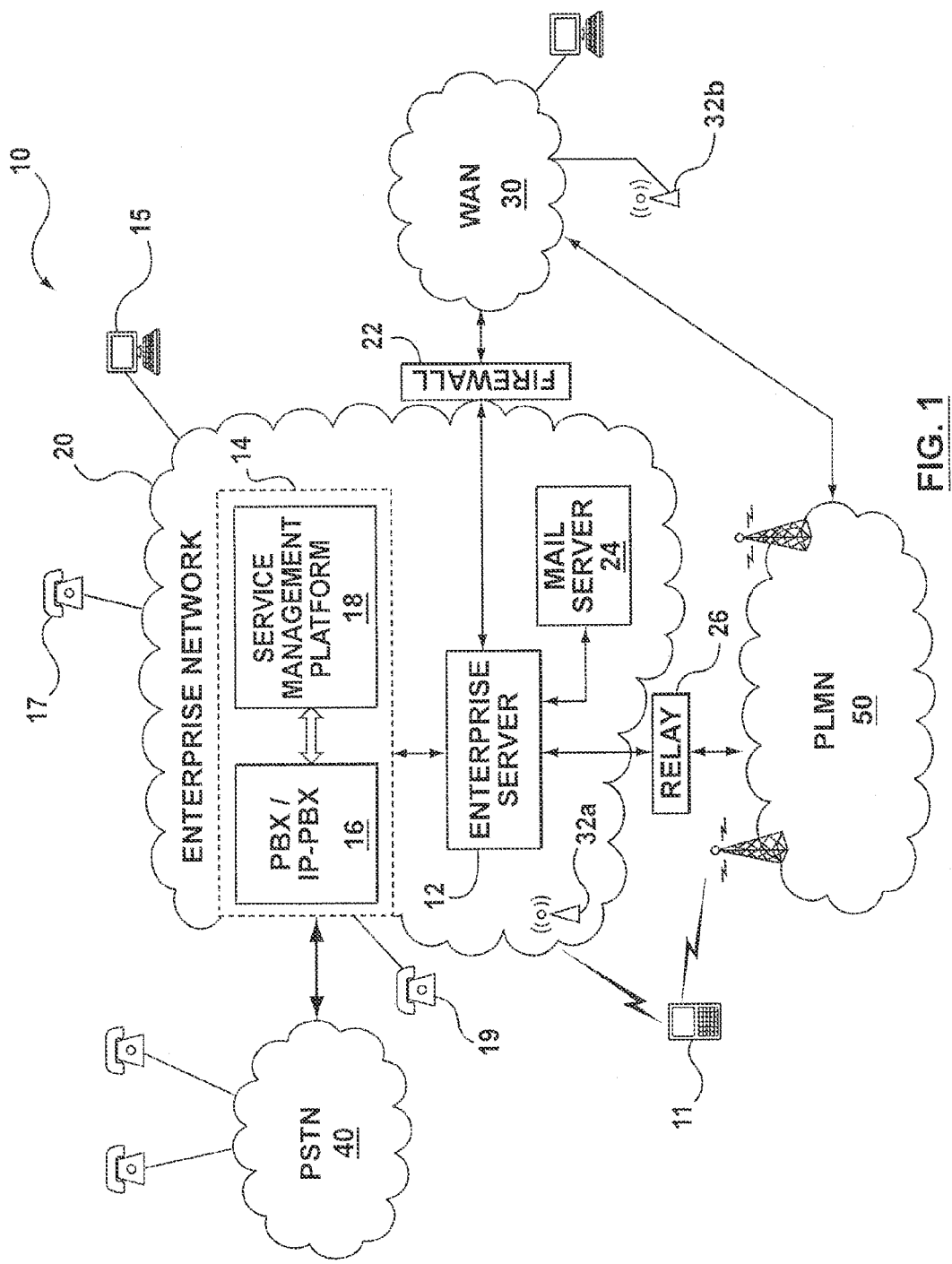
FIG. 1 shows, in block diagram form, an example system for managing enterprise-related mobile calls, including an enterprise communications platform, to which example embodiments may be applied.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public-switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped with communications modules for cellular communication through the PLMN 50, mobile devices equipped for Wi-Fi communications over one of the WLANs 32, or dual-mode devices capable of both cellular and data communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in a known manner, as the user moves In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The mobile devices 11 may be various types of communication devices. Such mobile devices 11 may include "Class A" devices, which are able to function continuously as dual-mode devices, capable of both media and data communications. Mobile devices 11 may also include "non-Class A" devices, which may function as dual-mode devices for initialization or prior to connection with the enterprise communications platform 14, but may lose data functionality once a media session (e.g., voice call) is established. The enterprise network 20 may also include additional client devices which are voice-only or media-only devices, which may be digital or analog for communication with PSTN 40, and which may not have data capabilities (herein referred to as "voice-only" or "media-only" devices). In other embodiments, the mobile devices 11 may include any suitable client device configured with the communications functionality described herein, and may for example include computer devices, relays, proxies, gateways and any appropriate User Agents (as defined in SIP).

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls, the enterprise communications platform 14 provides a number of additional functions including automated attendant, interactive voice response (IVR), call forwarding, voice mail, etc. It may also implement certain usage restrictions on enterprise users, such as blocking international calls or 1-900 calls. In many embodiments, Session Initiation Protocol (SIP) may be used to set up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 19. Example features may include direct extension dialing, enterprise voice mail, conferencing, call transfer, call park, etc.

Figure 2:
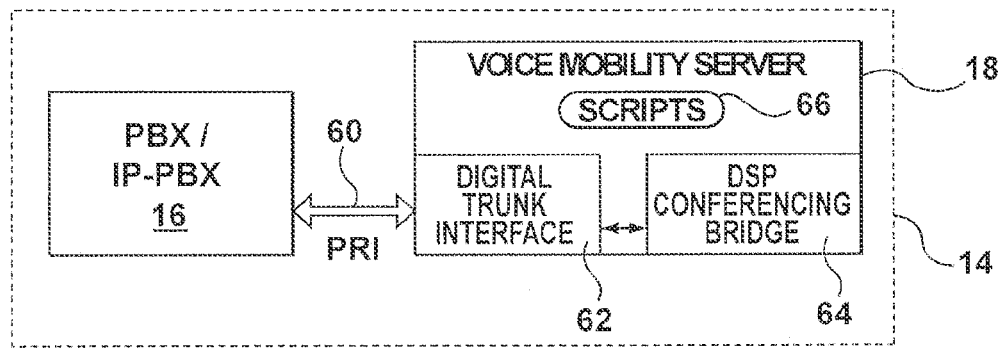
FIG. 2 shows, in block diagram form, further details of an embodiment of the enterprise communications platform.
Figure 3:
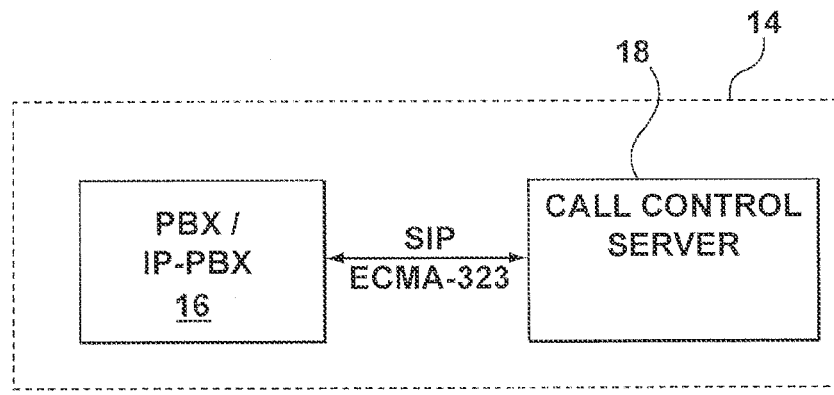
FIG. 3 shows another embodiment of the enterprise communications platform.
Figure 4:
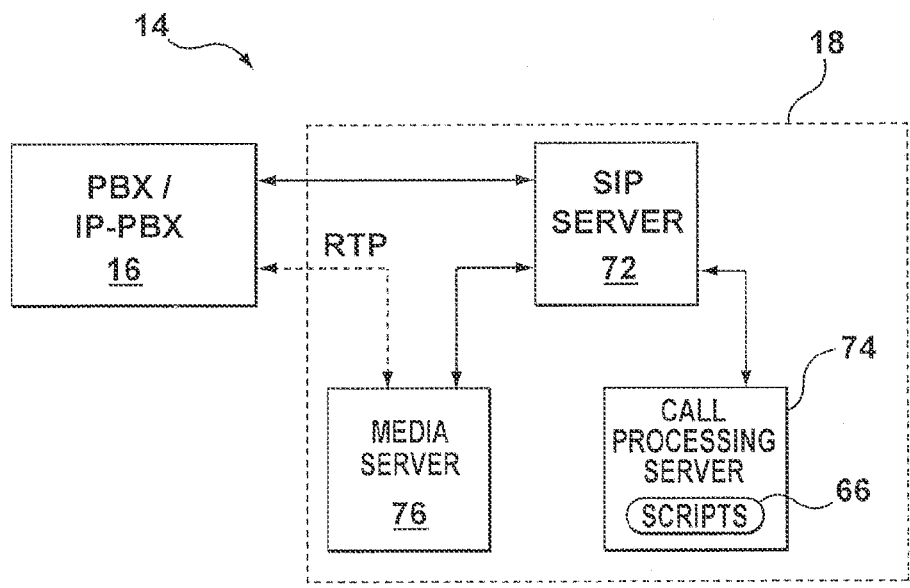
FIG. 4 shows yet another embodiment of the enterprise communications platform.

Reference is now made to FIGS. 2 to 4, which show example embodiments of the enterprise communications system 14. FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the setup, tear down, and control of media handled by the PBX 16. In one example embodiment, the call control server 18 may employ, a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML-based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
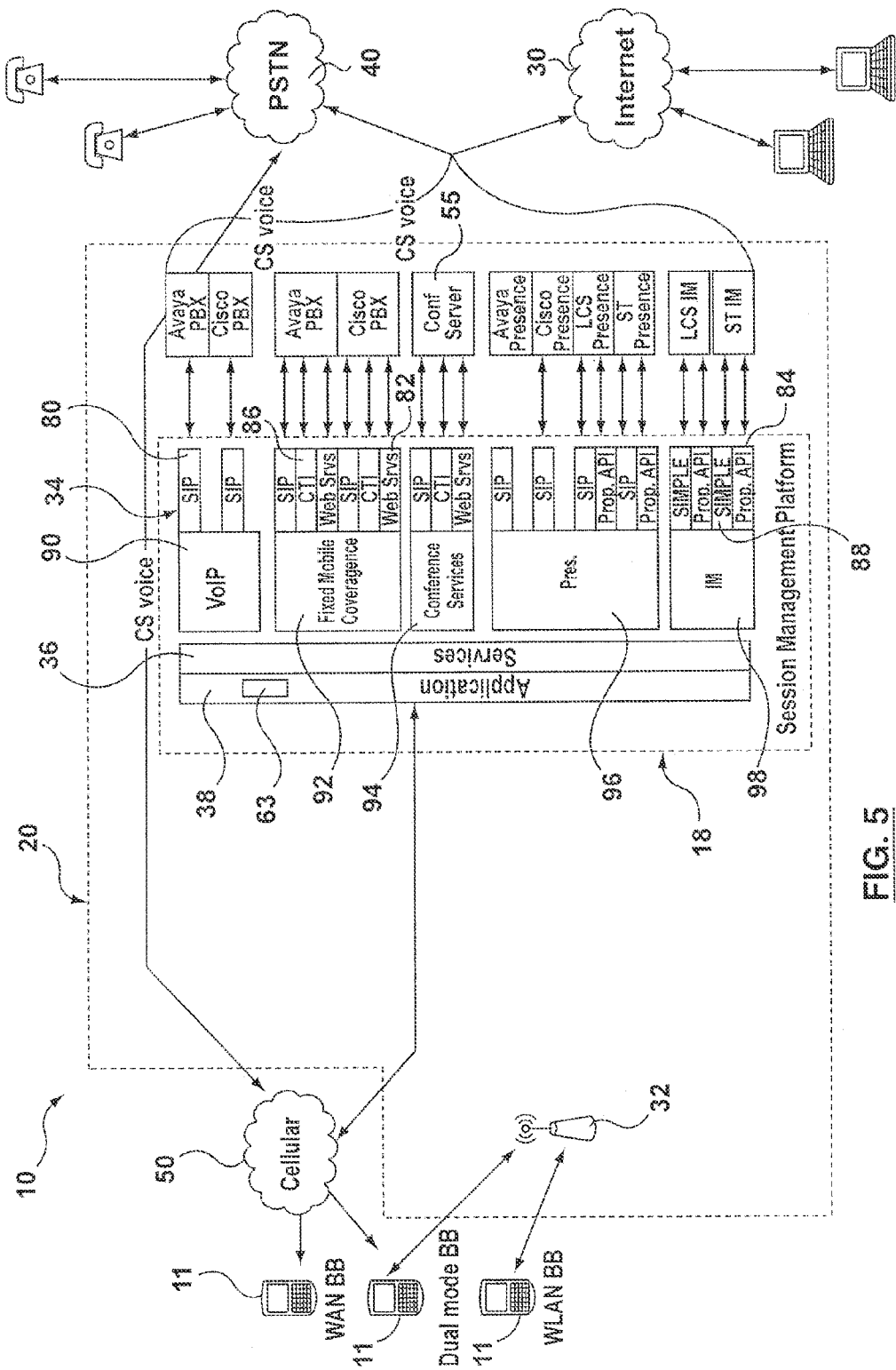
FIG. 5 shows further details of the enterprise communications platform of FIG. 3.

Reference is now made to FIG. 5, which shows another embodiment of the enterprise communications system 14 with a Third-Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

Although SIP 80 may be utilized, it is appreciated that the system 10 can operate using the above-disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). SIP is defined in J. Rosenberg et al., "RFC 3261—Session Initiation Protocol" (June 2002), the contents of which are herein incorporated by reference.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Example conference call systems and methods in accordance with example embodiments will now be described, referring now to FIG. 6, which shows the system 10 when used or configured as a conference call system. As shown, the enterprise communications platform 14 includes the conference server 55 for providing conference call services for a number of client devices such as mobile devices 11, illustrated as one designated host device 11a (or at least presently designated) and one or more participant devices 11c, 11d. One of the mobile devices 11 may also be designated as an alternative host device 11b (which may also function as a participant device). The mobile devices 11 may collectively form a conference call group. The host device 11a is generally the mobile device 11 or associated user who schedules and hosts a conference call session, and may for example be permitted to perform such hosting functions as roll call, mute all, conference lock, etc. The host device 11a may further be permitted to implement additional pre-conference or in-call hosting control functions, in accordance with example embodiments. In some conventional conferencing systems, a conference call session cannot proceed between the participants 11c, 11d without the host device 11a being in communication with the enterprise communications platform 14.

The enterprise communications platform 14 and the associated conference server 55 may be used for generally executing conference call functions, and for designating of hosting control as is described in detail herein. The conference server 55 may also store, among other items, a host identifier for identifying or designating at least one of the mobile devices 11 as a host device (e.g., designated host device 11a and/or alternate host device 11b). The host identifier also includes a permission right or an access right given to the identified mobile devices 11 for permitting implementation of hosting functions from the mobile device 11. The host identifier may also be used to permit partial access rights apportioned between different mobile devices 11, as appropriate. As described above, in example embodiments, the enterprise communications platform 14 may include or be coupled to the media server 76 (FIG. 4), wherein the enterprise communications platform 14 controls the media handling and media sessions of the media server 76.

Figure 6:
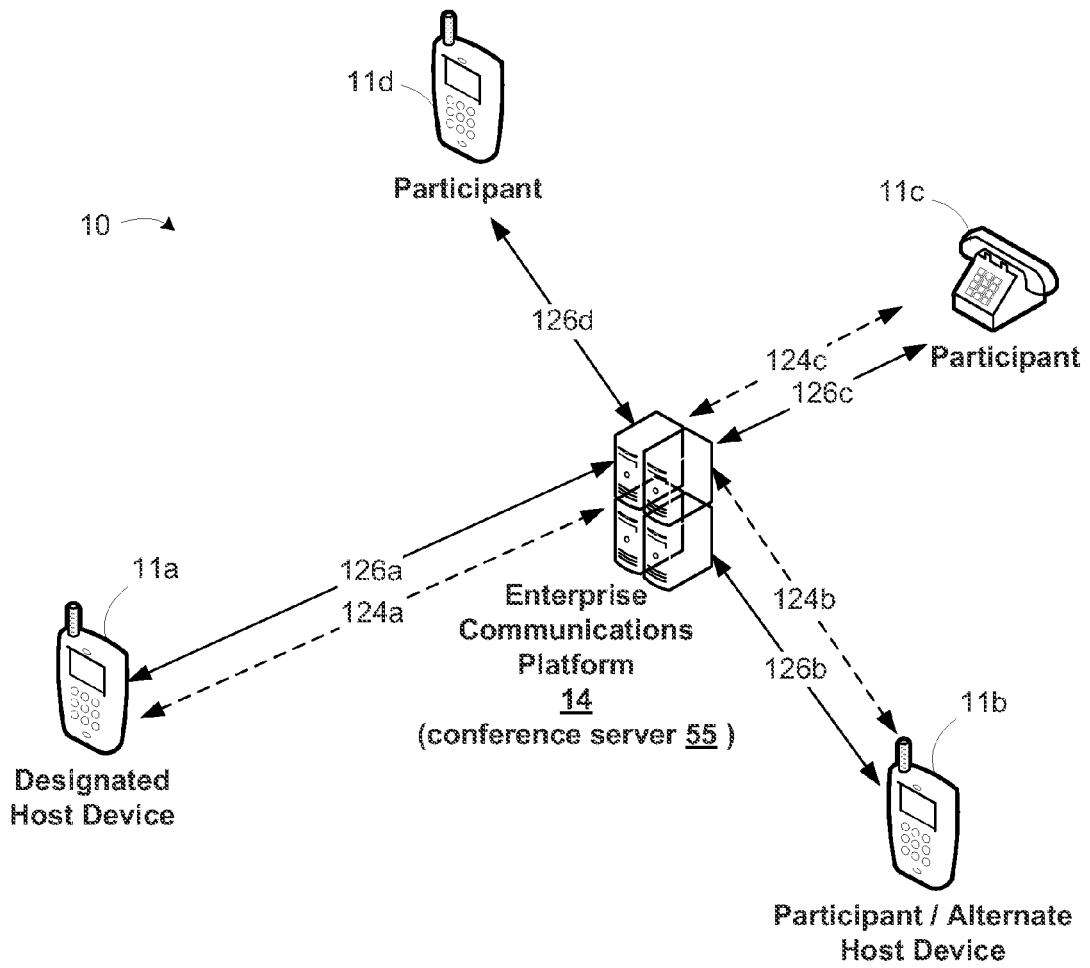
FIG. 6 shows, in block diagram form, a conference call system including the enterprise communications platform shown in FIG. 1 and client devices.

Referring still to FIG. 6, in order to implement some of the hosting control functions described herein, the enterprise communications platform 14 may communicate with the mobile devices 11 by way of media sessions and/or control sessions. As shown in FIG. 6, the mobile devices 11 communicate via media sessions 126 and control sessions 124 (shown as dashed lines to distinguish from the media sessions 126). For example, the designated host device 11a communicates via media session 126a and control session 124a. Alternate host device 11b communicates via media session 126b and control session 124b. Participant device 11c communicates via media session 126c and control session 124c. In some embodiments, as shown, the participant device 11d may merely communicate via media session 126d (without an associated control session).

The media sessions may be facilitated by the enterprise communications platform 14 by way of Real-time Transport Protocol (RTP) media sessions, and may include voice calls, video calls, circuit-switched calls or VoIP calls. In order to generate or establish a conference call session, the enterprise communications platform 14 connects or links at least some of the call legs of each media session 126. The particular methods and processes for connecting of media sessions 126 into a conference call session would be understood by those skilled in the art, which may for example be implemented by media shuffling, etc.

In some example embodiments, referring now to the control sessions 124, the type of control session generated by the enterprise communications platform 14 may be dependent on the type of mobile device 11, for example including but not limited to Class A devices, non-Class A devices, and media-only devices. If the mobile device 11 is a Class A device, the control session may for example be established using data-based communications. Such data-based communications include data messages, SIP-based implementations, e-mail, short-message-service (SMS) text messaging, etc. If the mobile device 11 is a media-only device, the enterprise communications platform 14 may establish the control session by for example using interactive voice response (IVR), which for example receives commands from the mobile device 11 by using both voice commands and touch tone (e.g. Dual-tone multi-frequency (DTMF)). In such an instance, the control session is established by merely establishing the media session with the mobile device 11 (e.g., by calling the mobile device 11), and thereafter communicating using IVR commands. If the mobile device 11 is a non-Class A device, the control session(s) 124 may be first generated using data-based messaging, and subsequently (once a media session is established) using IVR. The particular capabilities of each mobile device 11 may be detected by the enterprise communications platform 14 upon initial communication with each mobile device 11, as is known in the art. Alternatively, the capabilities may be preconfigured within the enterprise communications platform 14 prior to establishment of a conference call session. Communications are subsequently made via the appropriate communications platform or format within the enterprise communications platform 14.

Figure 7:
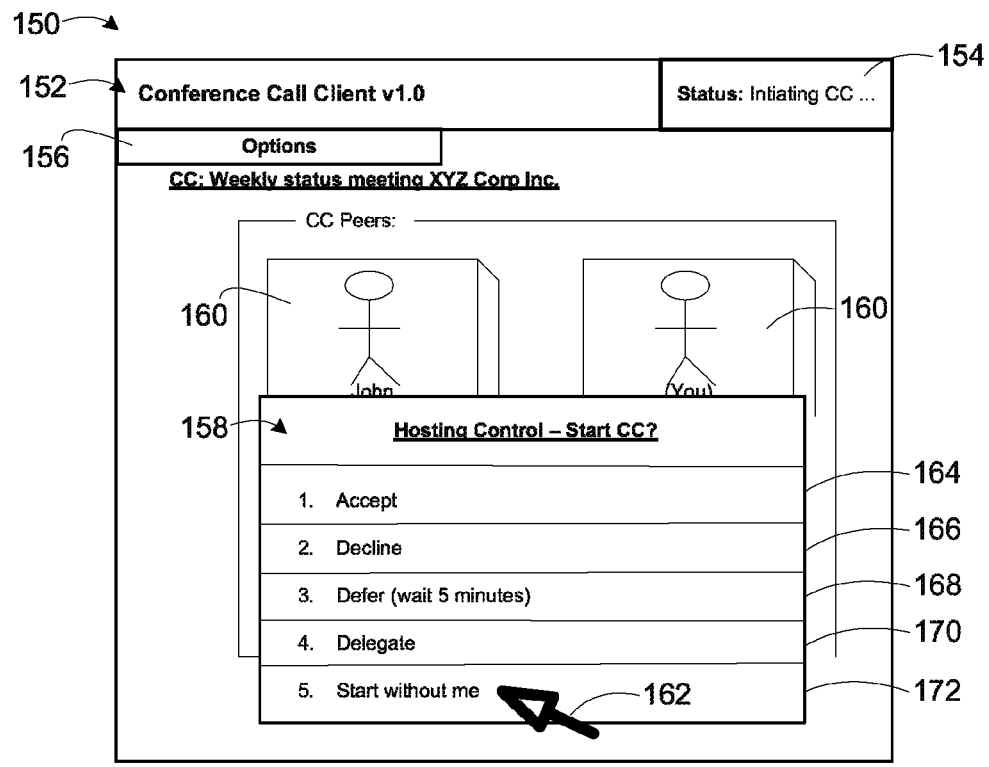
FIG. 7 shows a user interface for providing hosting control functions as displayed on a host client device in the system of FIG. 6, for initializing of a conference call.

Reference is now made to FIG. 7, which shows a user interface 150 which may be used as a user input for providing hosting control functions, shown as displayed on a display of one of the mobile devices 11 (e.g., the designated host device 11*a*). In the embodiment shown, the user interface 150 is for example implemented by a conference call application resident on the mobile device 11 for specifically communicating with the enterprise communications platform 14. The user interface 150 may form part of a conference call session initialization process.

The user interface 150 relates to a scheduled conference call session which is to occur at a scheduled time and date. For example, the time and date of the schedule conference call session may be stored within the conference call application or a calendar application. In some embodiments, the originating device which schedules the conference call session becomes the host device 11*a*. In other embodiments, the enterprise communications platform 14 sends a message to the specified device which is to be designated as the host device 11*a*. The user interface 150 may be displayed on the host device 11*a* based on a triggering event such as at a predetermined time period prior to the starting time of the scheduled conference call session, for example five minutes, ten minutes or thirty minutes prior. Further alerts such as ringing or vibrating may be effected concurrently on the host device 11*a* upon occurrence of the triggering event. The user interface 150 may also be manually triggered by launching and subsequently operating the conference call application, for example at any time prior to the scheduled conference call session.

In some embodiments, upon detection of the triggering event, the host device 11*a* may concurrently initiate the control session 124*a*, for example by the host device 11*a* initially sending a SIP INVITE command to the enterprise communications platform 14. In other embodiments, the host device 11*a* waits until a specific control hosting command is input into the user interface 150 prior to initiating the control session 124*a*. Specific implementations are described in detail below.

In other embodiments, the user interface 150 is for example displayed on the host device 11*a* based on an initial contact from the enterprise communications platform 14 to the host device 11*a*, for example based on a triggering event detected or provided at the enterprise communications platform 14. For example, the triggering event may once again be a predetermined time period prior to the starting time of the scheduled conference call session, in this instance initiated by the enterprise communications platform 14. In such an embodiment, the mobile device 11*a* upon receiving communications from the enterprise communications platform 14 causes the user interface 150 to "pop-up" or interrupt any current application running on the host device 11*a*.

Other triggering events may be effected in some embodiments. For example, the host device 11*a* may trigger the user interface 150 upon the actual occurrence of the time and date of the scheduled conference call session. In another example, referring briefly to FIG. 6, for example, the triggering event may be when the enterprise communications platform 14 receives a dial-in (i.e., control session or media session) from a specified or predetermined one of the other participant devices 11*b-d*. In another example, the triggering event is the first occurrence of receiving a dial-in from any of such participant devices 11*b-d*, wherein the participant device 11*b-d* is expecting to be joined into the conference call. After receiving such a triggering event, the enterprise communications platform 14 concurrently or soon after initiates the control session 124*a* with the host device 11*a* to effect launching the user interface 150.

As shown in FIG. 7, the user interface 150 includes a title bar 152, a status icon 154, an options icon 156, hosting control menu 158, and participant icons 160 (partially shown) which represent the status of each participant in the conference call. A cursor 162 is also shown for indicating which item(s) on the user interface 150 are to be selected. The status icon 154 displays the present status of the conference call, for example "Initiating CC" (Conference Call)" as shown in FIG. 7, which indicates that the host device 11*a* is presently engaging in the conference call session initialization process.

The hosting control menu 158 includes a list or number of hosting control functions or commands in accordance with some example embodiments. At least some of the hosting control functions include the enterprise communications platform 14 associating, de-associating or transferring of the host identifier with or between one or more of the mobile devices 11. Referring still to FIG. 7, the hosting control menu 158 includes a list of hosting control commands, which includes Accept 164, Decline 166, Defer (wait 5 minutes) 168, Delegate 170, and Start without me 172. Some or all of the hosting control functions may be displayed on the hosting control menu 158 depending on the particular application or current state of the scheduled conference call.

Generally, as part of the conference call session initialization process, the enterprise communications platform 14 communicates with the designated host device 11*a*, and for example associates the host identifier with the host device 11*a*. If the host device 11*a* selects Accept 164, the host device 11*a* remains the designated host for the conference call and the conference call session begins, for example by having the enterprise communications platform 14 contact the remaining mobile devices 11 (i.e., participants) or having the mobile devices 11 call into the enterprise communications platform 14.

If the host device 11a selects Decline 166, for example, the remaining mobile devices 11 (e.g., participants) are notified that the scheduled conference call has been cancelled. The notification may be made by phone call, data message, email, etc.

If the host device 11a selects Defer (wait 5 minutes) 168, the enterprise communications platform 14 terminates communication with the host device 11a and may contact the remaining mobile devices 11 and for example place them on hold with music for a predetermined amount of time (e.g., five minutes). After five minutes, the enterprise communications platform 14 once again communicates with the designated host device 11a and awaits the same hosting control commands of hosting control menu 158. In other embodiments, the remaining mobile devices 11 may be initially contacted by the enterprise communications platform 14 and may select an option (not shown) to be called back when the host device 11a returns and thereafter proceed with the conference call (e.g., by the host device 11a selecting Accept 164, Start without me 172, etc.).

If the host device 11a selects Delegate 170, the enterprise communications platform 14 is instructed to delegate assignment of the host identifier to an alternate host (e.g., alternate host device 11b (FIG. 6)). The choice of alternate host device 11b may be selected by way of an address or identifier such as a telephone number, unique identifier, personal information number (PIN), etc. In other example embodiments, there is a default or predetermined mobile device 11 which is considered the alternate host device 11b. The enterprise communications platform 14 contacts the alternate host device 11b, which becomes the present host device, and the alternate host device 11b may then be provided with the same host control option menu 194 (FIG. 7). In some embodiments, partial host control may be delegated to the alternate host device 11b while some host control is maintained in the designated host device 11a.

If the host device 11a selects Start without me 172, a conference call session is established with the remaining participant devices 11c, 11d while the host device 11a leaves the scheduled conference call session. When the host device 11a returns, the host device 11a becomes the designated host device for the conference call session.

Figure 8:
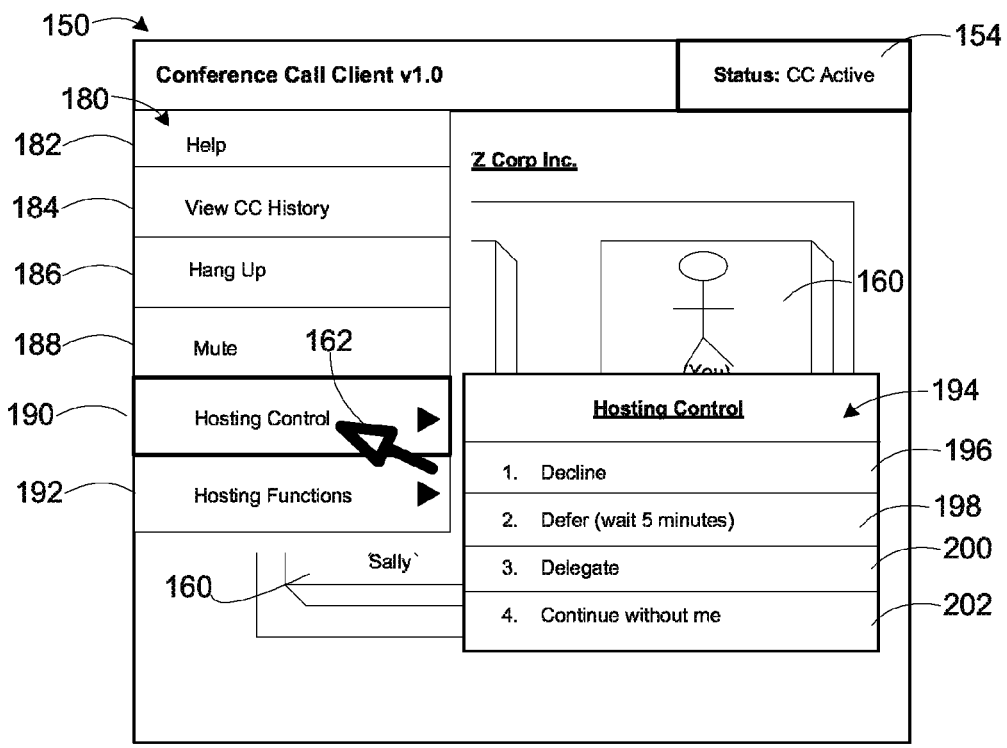
FIG. 8 shows the user interface of FIG. 7, for providing in-call hosting control functions for a conference call.

Reference is now made to FIG. 8, which shows the user interface 150 as displayed on the host device 11a when a conference call session is active. Thus, the status icon 154 displays "CC Active", as shown. Further, selection of the icon 156 (FIG. 7) results in the user interface 150 displaying an options menu 180. The options menu 180 displays a number of in-conference options relating to the conference call session at issue, and for example may be used to implement such corresponding functions as Help 182, View CC History 184, Hang Up 186, and Mute 188. Such functions would be understood by those skilled in the art and not described in detail herein.

The options menu 180 also includes a sub-menu (not shown) for hosting functions 192. The sub-menu (now shown) which is displayed after selection of hosting functions 192 for example includes but is not limited to such conventional hosting commands as toggling entry and exit announcement, participant count, conference continuation, server dial out, add participants, roll call, mute all, conference lock, etc. Such commands may be conventional hosting functions as would be understood by those skilled in the art and not described in detail herein.

As can be appreciated, the hosting control commands of the present embodiments should therefore not be confused with the aforementioned conventional hosting functions. Present examples of hosting control functions relate to the designating, associating, de-associating, and/or transferring of hosting control, which allows the presently designated host device to implement such hosting functions.

The hosting control sub-menu 194 may be displayed as a consequence of selecting the hosting control icon 190. As shown, the hosting control sub-menu 194 includes the hosting control functions for Decline 196, Defer (wait 5 minutes) 198, Delegate 200 and Continue without me 202. Such functions may operate in a similar manner as those hosting control commands described above with respect to the hosting control menu 158 (FIG. 7).

Referring still to FIGS. 7 and 8, the selection of hosting control options is not limited to being implemented by a specific application resident on the mobile device 11. In other example embodiments, the specific hosting control options and corresponding hosting control commands of the hosting control menu 158 may be communicated in real-time by communication of data messages from the enterprise communications platform 14 (e.g., SIP, e-mail, SMS, etc.). In other embodiments, for media-only devices, the hosting control options are communicated to the mobile device 11 using IVR over a media session.

Specific implementations of such hosting control commands in accordance with some example embodiments will now be described, referring now to FIGS. 9 to 14. FIGS. 9 to 13 show example conversations for implementing each of the above-mentioned hosting control functions from hosting control menu 158 (FIG. 7), respectively, when at an initializing process for a scheduled conference call session. FIG. 14 shows an example conversation for implementing the in-call Delegate command 170 (FIG. 7), for example, during an active conference call session.

Figure 9:
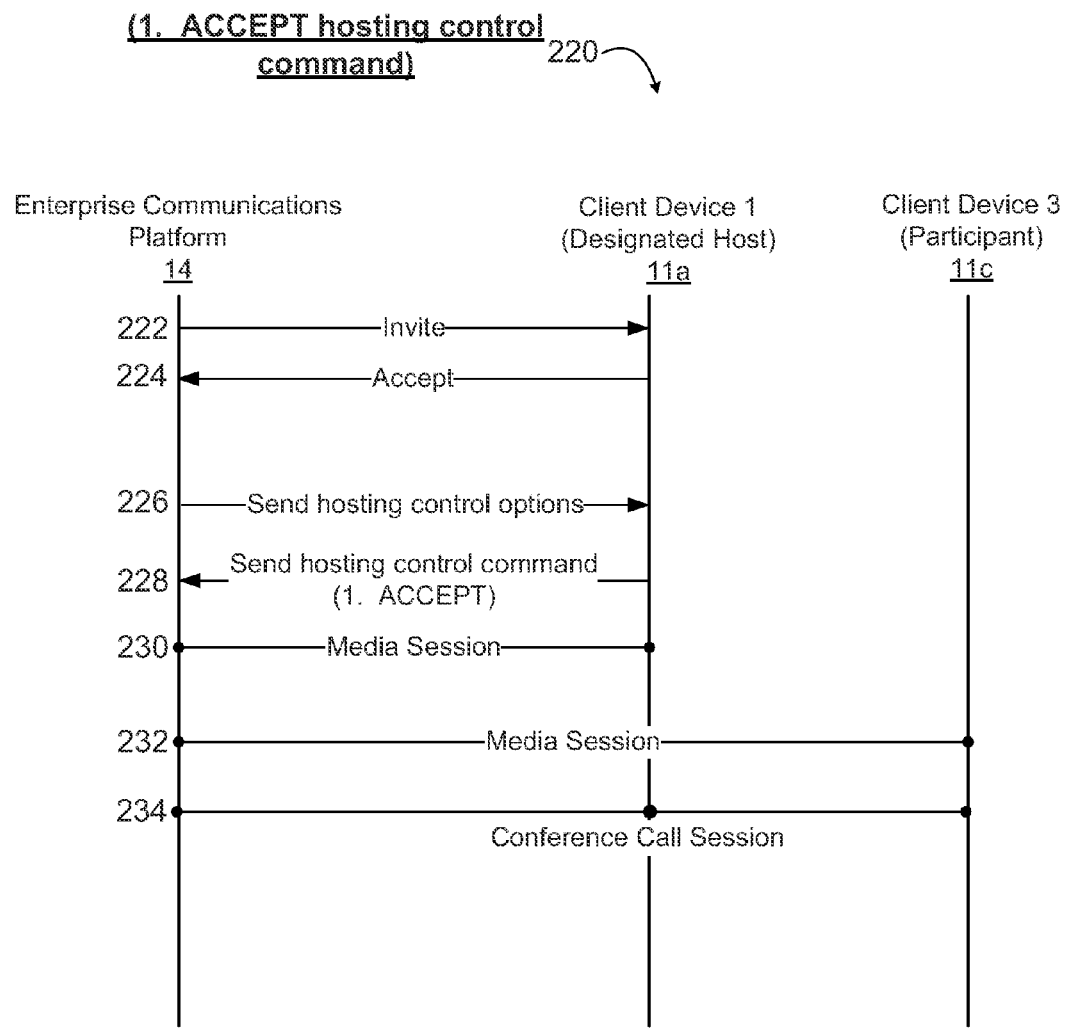
FIG. 9 shows an example conversation between the enterprise communications platform and client devices, illustrating operation of an accept hosting control command.

Reference is now made to FIG. 9, which shows an example conversation 220 between the enterprise communications platform 14, the designated host device 11a and a participant device 11c, illustrating operation of the Accept 164 hosting control command (FIG. 7). Generally, the Accept command instructs the enterprise communications platform 14 to begin a scheduled conference call session. Prior to the scheduled conference call session, the enterprise communications platform 14 may be pre-configured with the contact information of the designated host device 11a and each of the participant devices (e.g., 11c, 11d). The enterprise communications platform 14 may also have the host identifier associated with the host device 11a. The initial communication may for example originate and be initiated from the enterprise communications platform 14, which may also be referred to as a "mobile terminated server initiated call sequence" (or sometimes simply "server dial out").

As shown in FIG. 9, at message 222, the enterprise communications platform 14 sends an invite message to the host device 11a, indicating that a conference call session is to begin and that the host device 11a has been designated (at least initially) as the host device for the conference call session. At message 224, the host device 11a accepts the invite message 222. Messages 222 and 224 may also include provisioning of media parameters, for example for establishing a subsequent media session. Messages 222 and 224 may also include identification or authentication information, for example using a password or SIM (Subscriber Identity Module) for authenticating the host device 11*a*. At message 226, the enterprise communications platform 14 may send or provision hosting control options to the host device 11*a*. This may for example be in the form of a data message, or an IVR communication, as discussed above. The hosting control commands are for example those commands described above in hosting control menu 158 (FIG. 7). Sending of the message 226 may not be required in those above-described mobile devices which include a conference call specific application resident on the mobile device 11, for example which are pre-configured to display and provide the hosting control options on the user interface 150 (FIG. 7).

At message 228, the host device 11*a* selects the desired hosting control command, and in this example sends the message 228 including the Accept hosting control command to the enterprise communications platform 14. Upon receipt of the Accept command, the enterprise communications platform 14 initiates a media session 230 with the host device 11*a*. The enterprise communications platform 14 further initiates another media session 232 with the participant device 11*c*, and connects the media sessions together in a conference call session 234 (as would be readily implemented by those skilled in the art).

Figure 10:
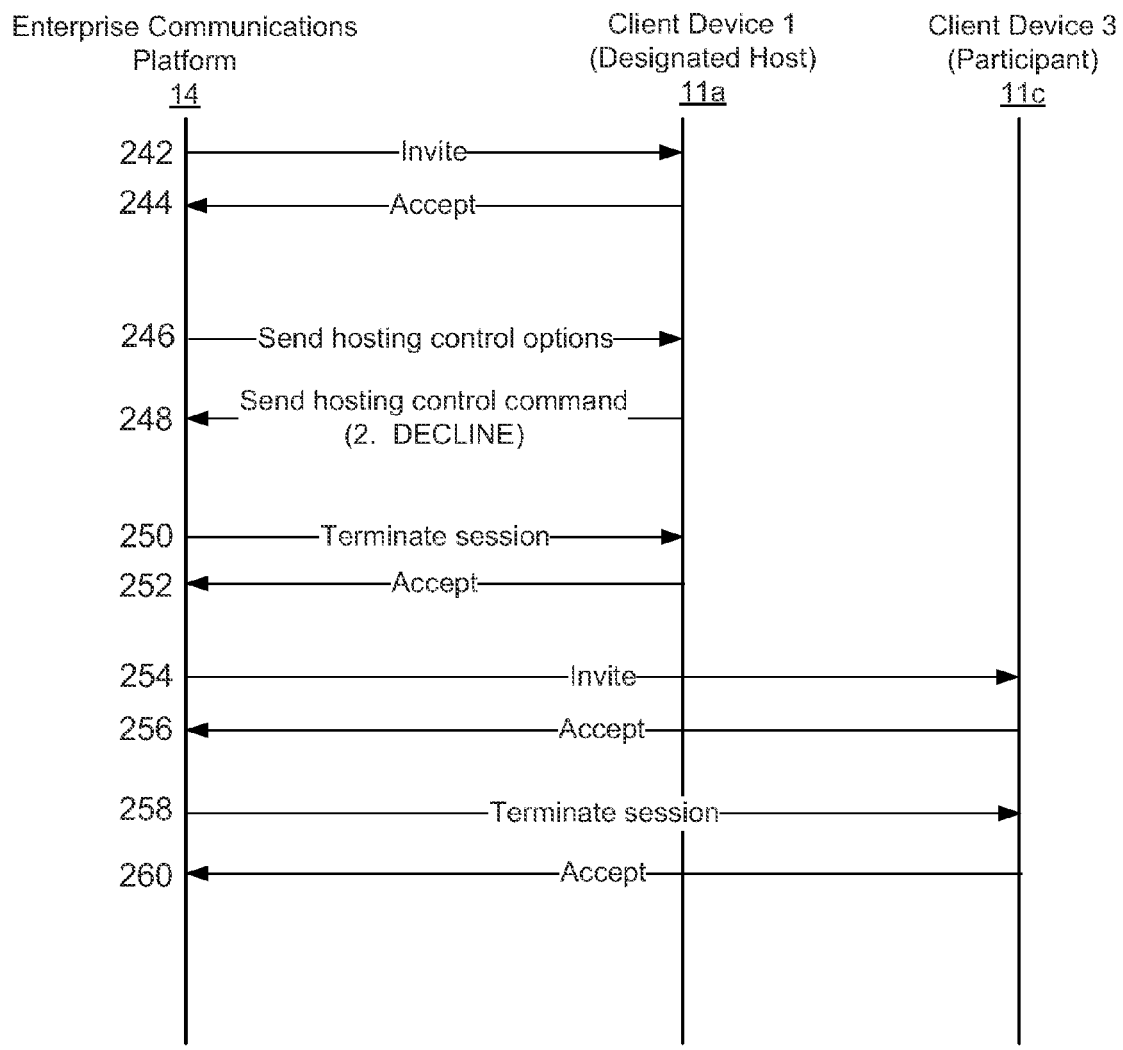
FIG. 10 shows an example conversation between the enterprise communications platform and client devices, illustrating operation of a decline hosting control command.

Reference is now made to FIG. 10, which shows an example conversation 240 between the enterprise communications platform 14, the designated host device 11*a*, and a participant device 11*c*, illustrating operation of the Decline 166 hosting control command (FIG. 7). Generally, the Decline command instructs the enterprise communications platform 14 that the scheduled conference call is not to proceed, and that the enterprise communications platform 14 is to notify the remaining mobile devices 11 (e.g., participant device 11*c*, as shown) that the scheduled conference call has been cancelled. The initial messages are similar to those described above with respect to the conversation 220 (FIG. 9). Thus, at message 242, the enterprise communications platform 14 sends an invite to the designated host device 11*a*, at message 244 the host device 11*a* accepts, and at message 246 the enterprise communications platform 14 may send hosting control options to the host device 11*a*.

Still referring to FIG. 10, at message 248, the designated host device 11*a* sends a Decline hosting control command to the enterprise communications platform 14. In response, at message 250 the enterprise communications platform 14 terminates the present session with the host device 11*a*. In some embodiments, at message 252 the host device 11*a* accepts the termination of the session.

The enterprise communications platform 14 thereafter (or concurrently) proceeds to communicate with the participant device 11*c* to advise that the host device 11*a* has declined and that the scheduled conference call session will end (i.e., has never started). At messages 254 and 256, the enterprise communications platform 14 initiates a session (control session or media session, as appropriate) with the participant device 11*c*. The enterprise communications platform 14 thereafter sends termination message 258, which includes a termination notification that the scheduled conference call session is terminated, for example will not be taking place. Such a termination message 258 may be a data message over a control session or an audio notification over a media session. At message 260, the participant device 11*c* may accept the termination message 258.

Figure 11:
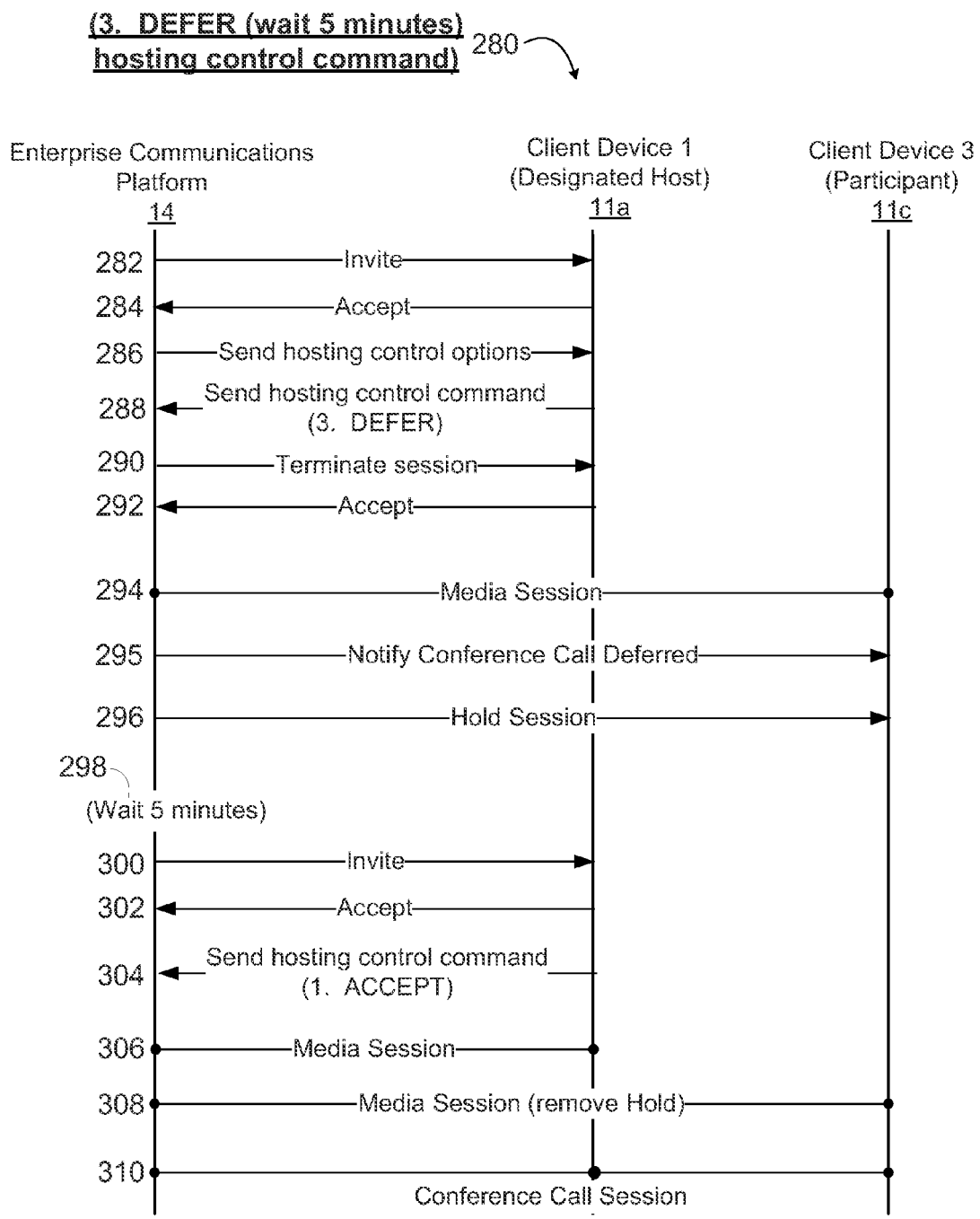
FIG. 11 shows an example conversation between the enterprise communications platform and client devices, illustrating operation of a defer hosting control command.

Reference is now made to FIG. 11, which shows an example conversation 280 between the enterprise communications platform 14, the designated host device 11*a*, and a participant device 11*c*, illustrating operation of the Defer (wait 5 minutes) 168 hosting control command (FIG. 7).

Generally, the Defer command instructs the enterprise communications platform 14 to terminate the present control session with the host device 11*a*, for example because the host device 11*a* will not be available for a predetermined amount of time. Further, the enterprise communications platform 14 thereafter may contact the remaining participant device 11*c*, notify the participant device 11*c* that the scheduled conference call session is being deferred, and for example place the participant device 11*c* on hold for the predetermined amount of time (e.g., 5 minutes). After 5 minutes, the enterprise communications platform 14 once again communicates with the designated host device 11*a* and awaits for another hosting control command.

The initial messages are similar to those described above with respect to the conversation 220 (FIG. 9). Thus, at message 282, the enterprise communications platform 14 sends an invite to the designated host device 11*a*, at message 284 the host device 11*a* accepts, and at message 286 the enterprise communications platform 14 may send hosting control options to the host device 11*a*.

At message 288, the designated host device 11*a* sends a Defer (wait 5 minutes) hosting control command to the enterprise communications platform 14. At message 290, the enterprise communications platform 14 terminates communication with the host device 11*a*, which may be accepted at message 292.

When implementing the Defer command, the enterprise communications platform 14 initiates a session, for example a media session 294, with the participant device 11*c*. At 295, the enterprise communications platform 14 notifies via a media message or a data message that the conference call session has been deferred and may proceed within 5 minutes. At 296, the enterprise communications platform 14 places the participant device 11*c* on hold for the predetermined duration of time.

In other embodiments, in the alternative to messages 294, 295 and 296, rather than being placed on hold, the participant devices 11*c* may be provisioned with or given an option (not shown) to be called back when the host device 11*a* returns, and therefore a media session is established once the host device 11*a* initiates the conference call session (e.g., by the host device 11*a* selecting Accept 164, Start without me 172, etc.). It can be appreciated that this may prevent wasted connection time over a communication network.

At 298, the enterprise communications platform 14 waits for the predetermined period of time to pass, for example 5 minutes. After 5 minutes have passed, the enterprise communications platform 14 may once again establish a control session with the host device 11*a*, as shown by invite message 300 and accept message 302. At message 304, the host device 11*a* may once again send one of the hosting control commands to the enterprise communications platform 14, for example the Accept command as shown in FIG. 11. A conference call session may thus be established, by way of media session 306 and media session 308, which are connected by way of conference call session 310.

Figure 12:
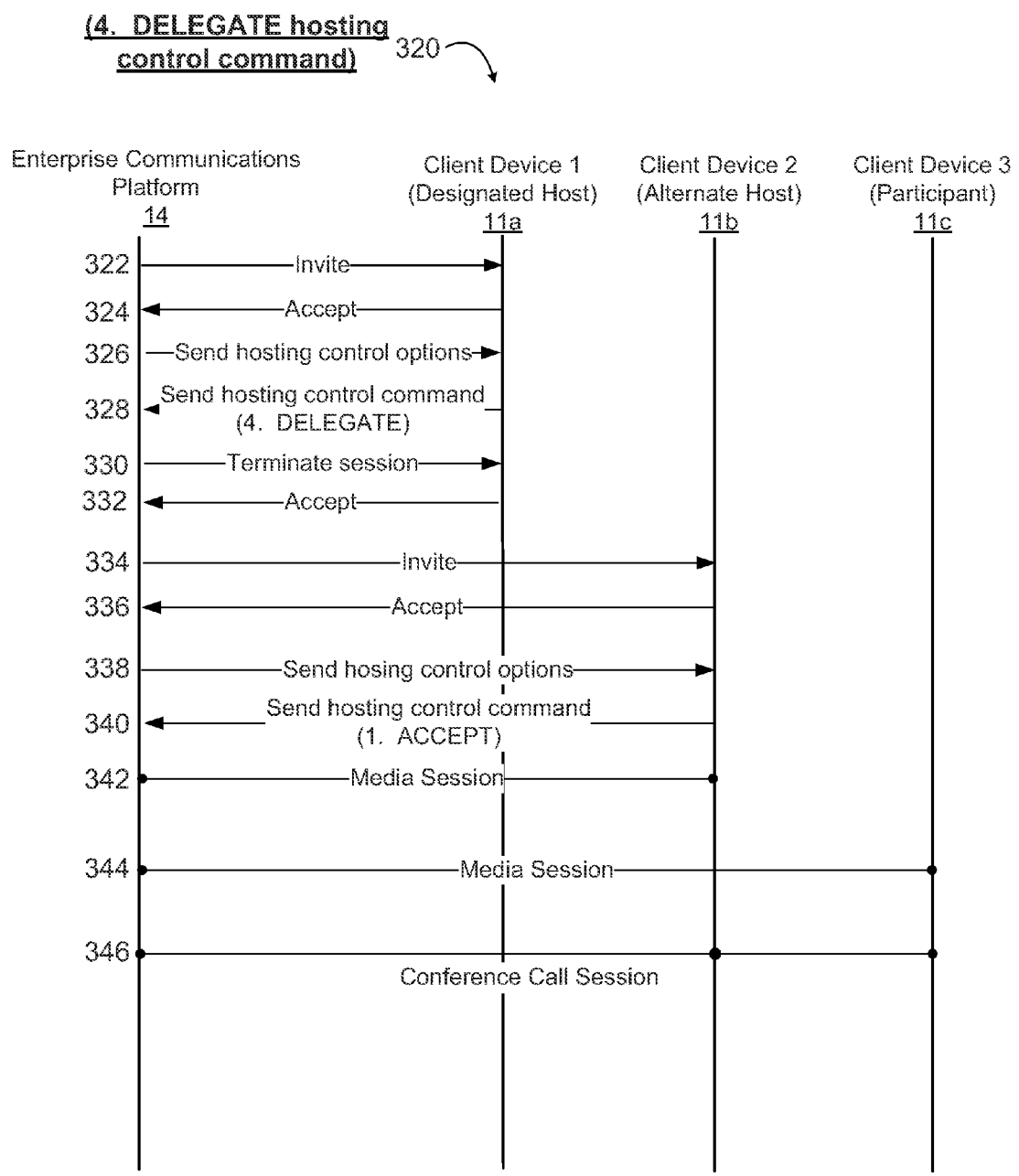
FIG. 12 shows an example conversation between the enterprise communications platform and client devices, illustrating operation of a delegate hosting control command.

Reference is now made to FIG. 12, which shows an example conversation 320 between the enterprise communications platform 14, the designated host device 11*a*, the alternate host device 11*b*, and a participant device 11*c*, illustrating operation of the Delegate 170 hosting control command (FIG. 7). Generally, the Delegate command instructs the enterprise communications platform 14 to delegate assignment of the host identifier to the alternate host device 11*b*. This for example allows the designated host device 11*a* to delegate hosting functions to the alternate host device 11*b*, for example should the host device 11*a* be unavailable for the conference call session. The initial messages are similar to those described above with respect to the conversation 220 (FIG. 9). Thus, at message 322, the enterprise communications platform 14 sends an invite to the designated host device 11a, at message 324 the host device 11a accepts, and at message 326 the enterprise communications platform 14 may send hosting control options to the host device 11a.

At message 328, the designated host device 11a sends a Delegate hosting control command to the enterprise communications platform 14. The choice of alternate host device 11b may be selected by way of an address or identifier such as a telephone number, unique identifier, etc. In other example embodiments, there is a default or predetermined mobile device 11 which is considered the alternate host device 11b. At message 330, the enterprise communications platform 14 terminates communication with the host device 11a, which may be accepted at message 332. At this stage, the hosting identifier stored within the enterprise communications platform 14 may no longer be associated (i.e., "de-associated" or "undesignates") with the designated host device 11a.

The enterprise communications platform 14 may thereafter establish a control session with the alternate host device 11b, by sending an invite at message 334, and which is accepted at message 336. The enterprise communications platform 14 thereafter associates the hosting identifier with the alternate host device 11b. At message 338, the enterprise communications platform 14 may send the same or similar hosting control options to the alternate host device 11b, similar to message 226 (FIG. 9), described in detail above. At message 340, the alternate host device 11b may send one of the hosting control commands to the enterprise communications platform 14, for example the Accept command as shown in FIG. 12. A conference call session may thus be established, by way of media session 342 and media session 344, which are connected by the enterprise communications platform 14 by way of conference call session 346. Of course, the designated host device 11a may become a "participant device" within this conference call session 346.

Figure 13:
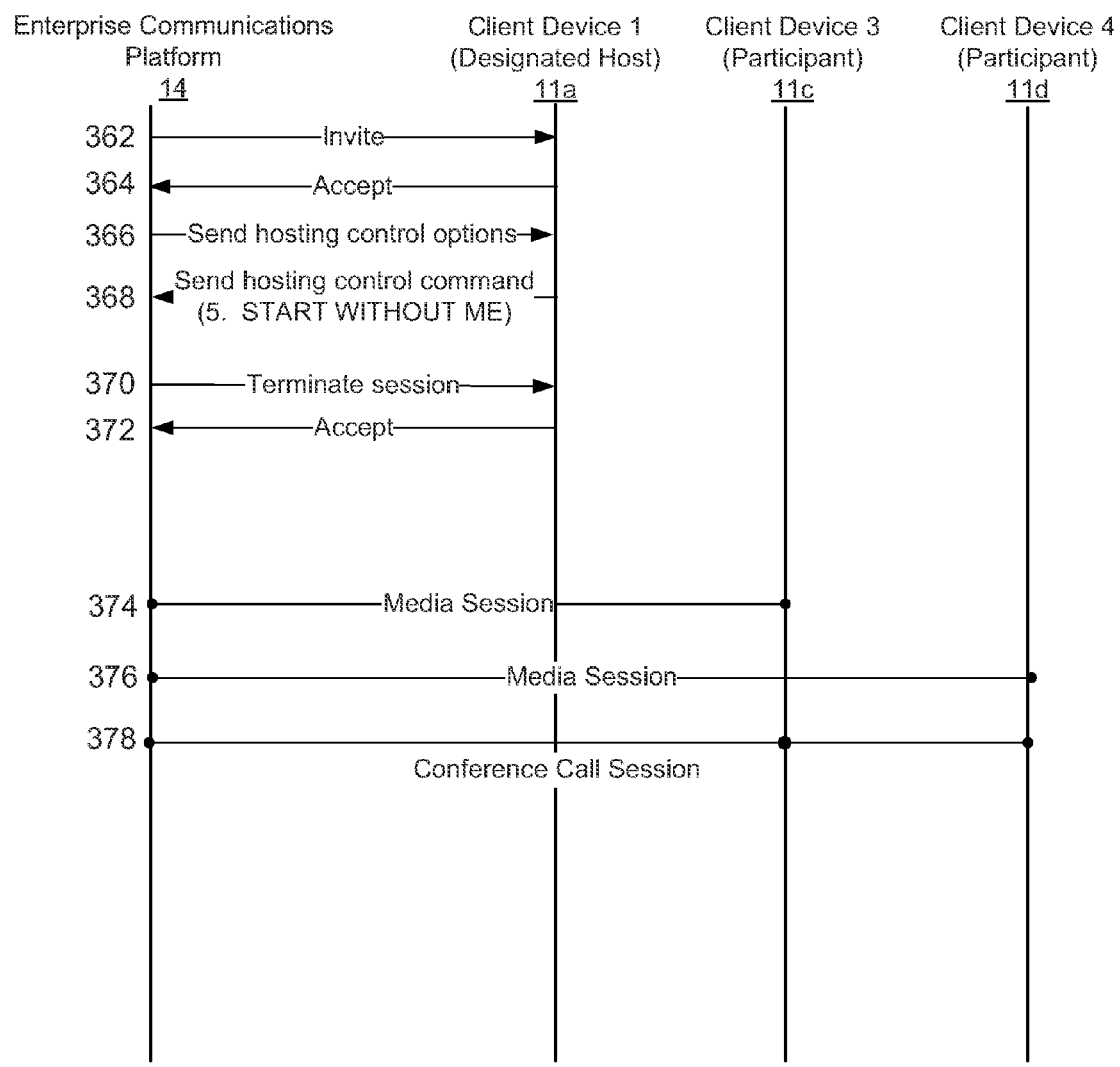
FIG. 13 shows an example conversation between the enterprise communications platform and client devices, illustrating operation of a "start without me" hosting control command.
Figure 14:
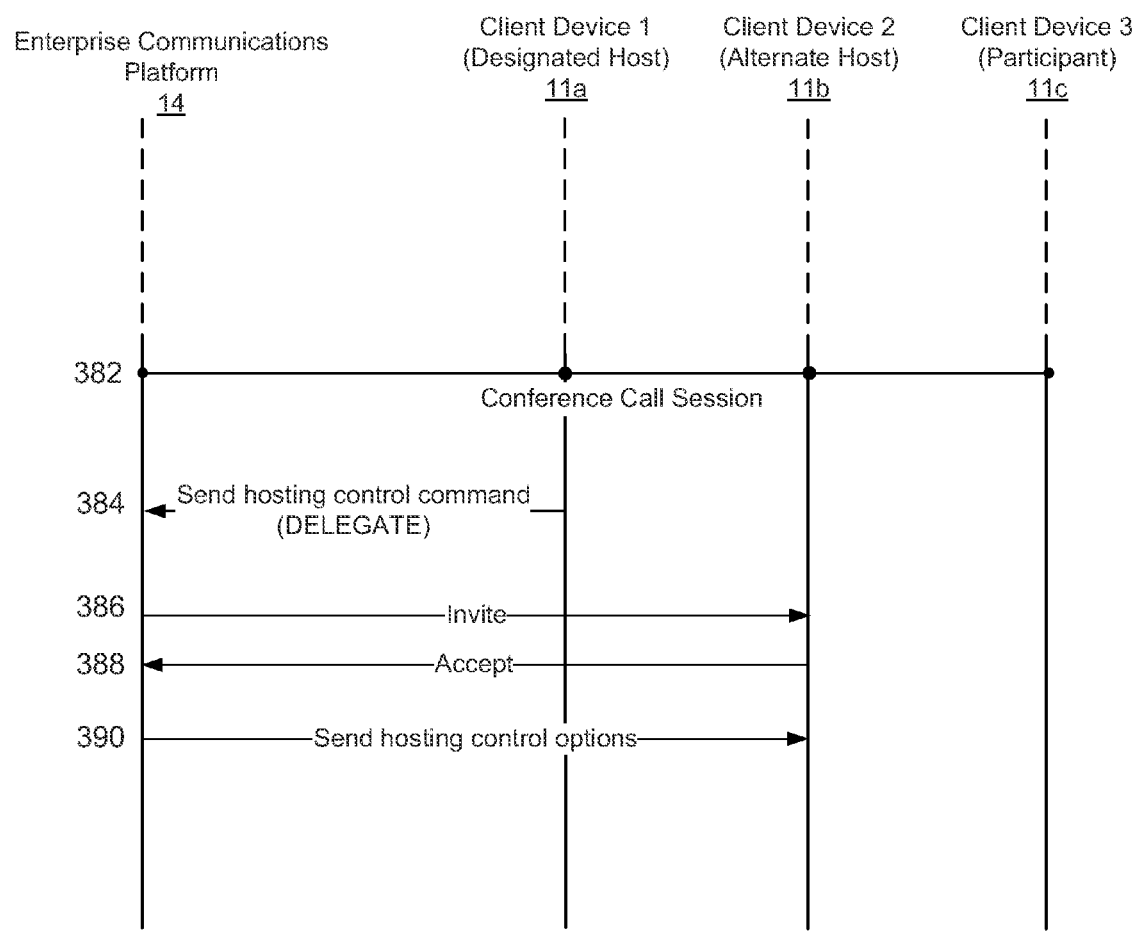
FIG. 14 shows an example conversation between the enterprise communications platform and client devices, illustrating operation of an "in-call" delegate hosting control command.

Reference is now made to FIG. 13, which shows an example conversation 360 between the enterprise communications platform 14, the designated host device 11a, participant device 11c, and participant device 11d, illustrating operation of the Start without me 172 hosting control command (FIG. 7). Generally, the Start without me command establishes a conference call session with the remaining participant devices 11c, 11d while the host device 11a leaves the scheduled conference call session. When the host device 11a returns to the active conference call session, the host device 11a becomes the designated host device for the conference call session. The initial messages are similar to those described above with respect to the conversation 220 (FIG. 9). Thus, at message 362, the enterprise communications platform 14 sends an invite to the designated host device 11a, at message 364 the host device 11a accepts, and at message 366 the enterprise communications platform 14 may send hosting control options to the host device 11a.

At message 368, the designated host device 11a sends a Start without me hosting control command to the enterprise communications platform 14. In response, at message 370, the enterprise communications platform 14 terminates communication with the host device 11a, which may be accepted at message 372. A conference call session 378 may thus be established without the host device 11a, by linking media session 374 and media session 376, which are connected by the enterprise communications platform 14 in a conference call session 378. It can be appreciated that the host identifier is maintained in association with the host device 11a at this stage. This for example allows the host device 11a to subsequently join the conference call session 378 as the designated host device.

Reference is now made to FIG. 14, which shows an example conversation 380 between the enterprise communications platform 14, the designated host device 11a, the alternate host device 11b, and a participant device 11c, illustrating operation of the in-call Delegate 200 hosting control command (FIG. 8). The conversation 380 for example occurs during an existing conference call session 382 (with connected media sessions) between the devices 11a, 11c, 11b. Such an "in-call" conversation 380 is illustrated by dashed timelines in FIG. 14. For example, the conference call session 382 includes the host identifier already being associated or maintained with the designated host device 11a. It can be appreciated that the Delegate 200 command may permit a designated host device 11a to transfer hosting control to the alternate host device 11b, for example when the designated host device 11a desires to leave the conference call session 382 while still having a host device.

At message 384, the designated host device 11a sends a Delegate hosting control command to the enterprise communications platform 14. In response, the hosting identifier stored within the enterprise communications platform 14 may no longer be associated (i.e., "de-associated" or "undesignated") with the designated host device 11a. The enterprise communications platform 14 then establishes a control session with the alternate host device 11b (or uses an existing control session if one exists), as illustrated by invite message 386 and accept message 388. The enterprise communications platform 14 thereafter associates the hosting identifier with the alternate host device 11b. At message 390, the enterprise communications platform 14 may send hosting control options to the alternate host device 11b, in a similar manner as discussed in detail above. At this stage, the alternate host device 11b becomes the host device for the existing conference call session 382. In other embodiments, the alternate host device 11b includes a resident application for implementing some of the hosting control commands (e.g., as illustrated by user interface 150 (FIGS. 7 and 8)).

Variations of the above example conversations may be used. While some of the above example conversations have been described as occurring in a particular order, it will be appreciated by persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary.

Some of the above example conversations may be referred to as a mobile terminated server initiated call sequence (and may sometimes also be referred to as "server dial out"). Alternatively, depending on the particular application, some or all of the call sequences could be mobile originated mobile initiated, mobile originated server initiated, or mobile terminated mobile initiated, as would be understood by those skilled in the art.

In one aspect, there is provided a method for controlling a conference call session using a first client device, wherein a server device is configured to establish conference call sessions with the first client device and one or more other client devices, and wherein the server device stores a host identifier for designating the first client device as a host for the conference call session. The method includes displaying a user interface on the first client device, the user interface including hosting control command options including a delegate command; receiving a hosting control command selecting the delegate command; and sending a delegate instruction to the server device instructing the server device to change the host identifier to designate one of the other client devices as the host for the conference call session.

In another aspect, there is provided a client device, which includes a communications module for communicating with a server device, the server device being configured to establish a conference call session with the client device and one or more other client devices, and wherein the server device stores a host identifier for designating the client device as a host for the conference call session. The client device further includes a user interface including hosting control command options including a delegate command. The client device is configured for, in response to the receiving a hosting control command selecting the delegate command, sending a delegate instruction to the server device instructing the server device to change the host identifier to designate one of the other client devices as the host for the conference call session.

Certain adaptations and modifications of the described embodiments can be made. Therefore, the above-discussed embodiments are considered to be illustrative and not restrictive.

What is claimed is:

1. A method for controlling a conference call session using a first client device, the method comprising:
    establishing with a server device a control session for a conference call;
    displaying, on the first client device, a user interface, the user interface including hosting control command options comprising a defer command;
    receiving, by the first client device, a selection of the defer command; and
    sending, from the first client device, a defer instruction to the server device, the defer instruction including information for terminating the control session with the first client device and for establishing, based on a predetermined amount of time, another control session for the conference call.

2. The method of claim 1, wherein said sending is performed as part of a conference call session initialization process prior to the server device providing the conference call session between the client devices.

3. The method of claim 1, wherein said displaying is performed based on a predetermined triggering event in relation to a scheduled conference call session.

4. The method of claim 3, wherein said predetermined triggering event includes receiving in the first client device from the server device a message that the first client device is designated as the host for the conference call session.

5. The method of claim 1, wherein the hosting control command options further comprise a delegate command which when selected causes the first client device to send a delegate instruction to the server device for changing a host identifier to undesignate the first client device as the host device, and to designate a second client device selected from the other client devices as the host for the conference call session.

6. The method of claim 5, wherein said delegate instruction includes an identification of said second client device.

7. The method of claim 1, wherein said sending is sent from said first client device on a communications platform dependent on a capability type of said first client device.

8. The method of claim 5, wherein the host identifier includes a permission right for permitting server device implementation of hosting functions from the host device.

9. A client device for controlling a conference call, the client device comprising:
    a communications module configured to establish with a server device a control session for a conference call; and
    a user interface including hosting control command options comprising a defer command,
    wherein
    the client device is configured to receive a hosting control command selection, and send a defer instruction to the server device, the defer instruction including information for terminating the control session with the first client device and for establishing, based on a predetermined amount of time, another control session for the conference call.

10. The client device of claim 9, wherein said user interface is implemented as part of a conference call session initialization process prior to the server device establishing the conference call session between the client devices.

11. The client device of claim 9, wherein said user interface is triggered based on a predetermined triggering event in relation to a scheduled conference call session.

12. The client device of claim 11, wherein said predetermined triggering event includes receiving from the server device a message that the client device is designated as the host for the conference call session.

13. The client device of claim 9, wherein the hosting control command options further comprise a delegate command which when selected causes the client device to send a delegate instruction to the server device for changing a host identifier to undesignate the client device as the host device, and to designate a second client device selected from the other client devices as the host for the conference call session.

14. The client device of claim 13, wherein said delegate instruction includes an identification of said second client device.

15. The client device of claim 9, wherein said sending is communicated using the communications module on a communications platform dependent on a capability type of said client device.

16. The client device of claim 9, further comprising a display screen for displaying the user interface.

* * * * *